(12) United States Patent
Dillon et al.

(10) Patent No.: US 8,223,717 B2
(45) Date of Patent: Jul. 17, 2012

(54) ROAMING GATEWAY

(75) Inventors: Aidan Dillon, Dublin (IE); Robert Ryan, County Dublin (IE); David Doran, Dublin (IE); Louis Corrigan, County Meath (IE)

(73) Assignee: Accuris Technologies, Dublin (IE)

( * ) Notice: Subject to any disclaimer, the term of this patent is extended or adjusted under 35 U.S.C. 154(b) by 597 days.

(21) Appl. No.: 12/309,884

(22) PCT Filed: Aug. 2, 2007

(86) PCT No.: PCT/IE2007/000076
§ 371 (c)(1),
(2), (4) Date: Feb. 2, 2009

(87) PCT Pub. No.: WO2008/015660
PCT Pub. Date: Feb. 7, 2008

(65) Prior Publication Data
US 2009/0323636 A1 Dec. 31, 2009

(30) Foreign Application Priority Data
Aug. 3, 2006 (IE) .................................... 2006/0582

(51) Int. Cl.
*H04W 4/00* (2009.01)
(52) U.S. Cl. ........................................................ 370/331
(58) Field of Classification Search .................... 370/331
See application file for complete search history.

(56) References Cited

U.S. PATENT DOCUMENTS

| 7,640,036 | B2 * | 12/2009 | Kallio | 455/552.1 |
| 2004/0233930 | A1 * | 11/2004 | Colby, Jr. | 370/464 |
| 2005/0170861 | A1 | 8/2005 | Niemi et al. | |
| 2006/0121916 | A1 | 6/2006 | Aborn et al. | |
| 2007/0242672 | A1 * | 10/2007 | Grayson et al. | 370/392 |
| 2010/0150110 | A1 * | 6/2010 | Dutta et al. | 370/331 |
| 2010/0272096 | A1 * | 10/2010 | Witzel et al. | 370/352 |

OTHER PUBLICATIONS

Bellavista et al. "SIP-based Proactive Handoff Management for Session Continuity in the Wireless Internet." Distributed Computing Systems Workshops, Jul. 4, 2006.
International Search Report dated Nov. 7, 2007.

* cited by examiner

*Primary Examiner* — Kenny Lin
*Assistant Examiner* — Saad A Waqas
(74) *Attorney, Agent, or Firm* — Jacobson Holman PLLC

(57) ABSTRACT

A roaming gateway has at least one IP network interface, and at least one cellular network interface, and inter-working functions for inter-working between a wireless IP network and a cellular network. The inter-working functions communicate with user devices in an IP network according to a machine-level subscribe-and-notify event package protocol for managing handover of mobile devices roaming between IP and cellular networks. They also poll a cellular network for subscriber status on that cellular network in the absence of a mobility event package. The inter-working functions comprise HSS functionality programmed to access data on a HLR of a cellular network and to perform HSS operations using said data. The gateway applies routing policies specific to call types, allowing or disallowing the anchoring of calls originating in either an IP network or a cellular network based on number prefixes. The inter-working functions comprise an application server programmed to communicate with a user device as a client. The server provides a staging point for cellular supplementary services while anchoring calls, retrieving configurations from cellular network elements and applying appropriate routing based on these configurations and the current state of a call.

12 Claims, 17 Drawing Sheets gsmSCF redirecting a MO call. The originating circuit switch call is redirected to the AccuROAM™ VCC-AS.

gsmSCF redirecting a MT call. The terminating circuit switch call is redirected to the AccuROAM™ VCC-AS.

Acting as a gsmSCF and B2BUA; anchoring a mobile origintated circuit switch call and originating a VoIP call on behalf of the VCC subscriber.

Acting as a gsmSCF and B2BUA; anchoring a mobile terminated circuit switch call and originating a VoIP call towards the VCC subsciber. The MM-AS retrieves the MSRN from the serving VLR.

Acting as a B2BUA; anchoring a mobile origintated VoIP call on behalf of the VCC subscriber. The VCC client requests call setup using a MEP NOTIFY.

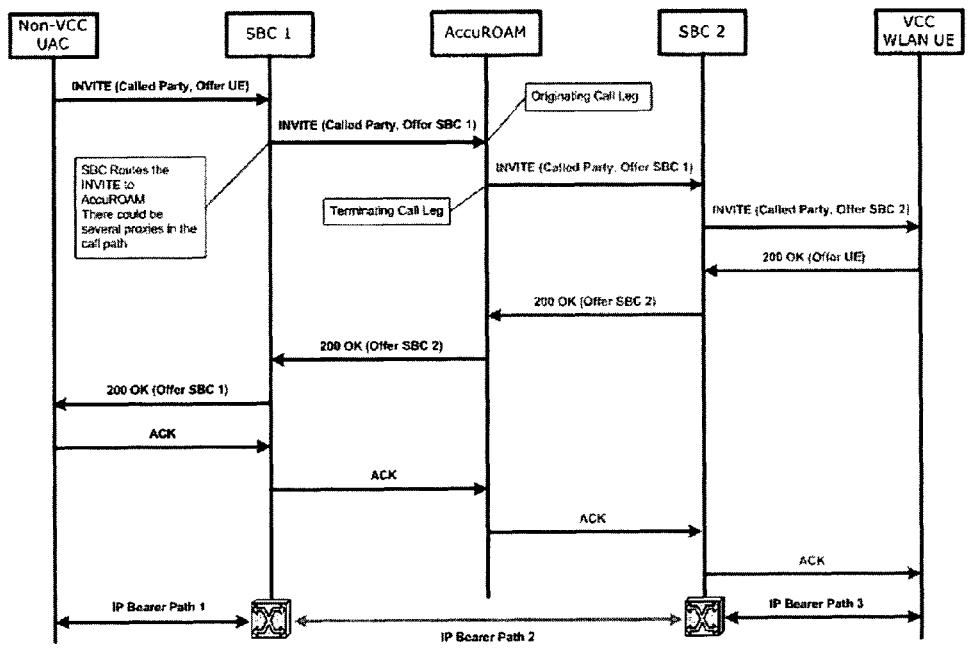

Acting as a B2BUA; anchoring a mobile originated VoIP call on behalf of the VCC subscriber. The non-VCC client requests call setup using an INVITE which is routed (via SIP intermediaries) to the VCC-AS. The NeDS will decide upon the terminating network i.e CS or IP. In the case where a VCC client requests call setup to another VCC client, the MEP notify is first sent to VCC-AS.

Fig. 9

Acting as VCC-AS, provide the VCC client with a Temporary Reference Number (TRN) to facilitate the establishment of a VoIP call between Called Party -> SBC -> Softswitch 2 and the tearing down of the circuit switch call between Called Party -> MSC -> Softswitch 1-> Softswitch 2.

Acting as VCC-AS provide the VCC client with a TRN to facilitate the establishment of a circuit switch call between Called Party -> MSC -> Softswitch 1-> Softswitch 2 and the tearing down of the VoIP call between Called Party -> SBC -> Softswitch 2.

ROAMING GATEWAY

This is a national stage of PCT/IE2007/000076 filed Aug. 2, 2007 and published in English, which has a priority of Irish No. 2006/0582 filed Aug. 3, 2006, hereby incorporated by reference.

INTRODUCTION

1. Field of the Invention

The invention relates to a roaming gateway for mobile devices including wireless computers and other mobile/wireless devices.

2. Prior Art Discussion

The 3GPP IP Multimedia Subsystem (IMS) is rapidly becoming the de facto standard for real-time multimedia communications services. Although the IMS was originally specified for 3G mobile networks, it also provides a service deployment architecture for any fixed or wireless network, and all IP-based networks such as WiFi, corporate enterprise LANs, and the public Internet. IMS standards define open interfaces for session management, access control, mobility management, service control, and billing. This allows the network provider to offer a managed SIP network, with all the carrier-grade attributes of the switched circuit network, but at a lower cost and with increased flexibility. In addition, the use of SIP as a common signalling protocol allows independent software developers to leverage a broad range of third party application servers, media servers, and SIP-enabled end user devices to create next generation services.

IMS is access independent, as it supports IP to IP sessions over fixed line IP, 802.11, 802.15, CDMA, packet data along with GSM/EDGE/UMTS and other packet data technologies. IMS is a standardised reference architecture that consists of connection control, session control, media transport, subscriber profile management, subscriber data management and an applications services framework enabling a multitude of new and innovative services.

IMS is independent of the underlying access technology and this is seen as the key driver behind the convergence of fixed, mobile and enterprise telephony. IMS is seen as a disruptive technology, in that it has no traditional telephony switches; voice being transported from one phone to another via IP routers. In this way, voice telephony is simply another Internet application, like e-mail or web browsing.

The key to enabling multi-media services is the use of IETF based protocols and architectures for providing network control, session establishment and seamless service access.

The successful transition from the current circuit-switched model to an Internet-based model requires a smooth migration that includes interworking between current telecom systems and Internet systems.

The most popular signalling protocol emerging for Internet telephony is the Session Initiation Protocol. SIP is viewed as an enabler for unifying voice services such as conference calling and interactive voice response, with data services such as Instant Messaging and Presence and Availability Services. SIP has become part of the next generation standards for both CDMA2000 and UMTS third generation wireless networks.

The invention is directed towards providing a more versatile roaming gateway for meeting the demands for roaming within the above environments and also to existing cellular infrastructure.

SUMMARY OF THE INVENTION

According to the invention, there is provided a roaming gateway comprising at least one IP network interface, and at least one cellular network interface, and an inter-working means for inter-working between a wireless IP network and a cellular network, wherein the inter-working means comprises means for communicating with user devices in an IP network according to a machine-level subscribe-and-notify event package protocol for managing handover of mobile devices roaming between IP and cellular networks, and comprises means for polling a cellular network for subscriber status on that cellular network in the absence of a mobility event package.

In one embodiment, the inter-working means comprises HSS functionality programmed to access data on a HLR of a cellular network and to perform HSS operations using said data.

In one embodiment, the inter-working means comprises means for applying routing policies specific to call types, allowing or disallowing the anchoring of calls originating in either an IP network or a cellular network based on number prefixes.

In one embodiment, the inter-working means comprises an application server programmed to communicate with a user device as a client.

In one embodiment, the server comprises means for providing a staging point for cellular supplementary services while anchoring calls, retrieving configurations from cellular network elements and applying appropriate routing based on these configurations and the current state of a call.

In one embodiment, the inter-working means comprises means for applying anchoring or handover criteria according to geographic location information relating to the current location of the subscriber, thereby avoiding tromboning.

In a further embodiment, the inter-working means uses a mobility event package to coordinate transfer of user-created messages between user devices and the gateway in mobile originating cases, and for translating this message for onward delivery.

In one embodiment, the inter-working means comprises means for including event package formatting and bearer information.

In one embodiment, the inter-working means comprises means for obtaining formatting and bearer information from a network and from configuration settings.

In one embodiment, the inter-working means comprises means for acting as a proxy VLR and as a proxy SGSN for the purposes of intercepting relevant mobile terminated voice calls or messages from a cellular network, for a subsequent delivery attempt via IMS protocol.

In one embodiment, the inter-working means comprises means for communicating with an SMSC in a cellular network to indicate a preference to receive messages for particular subscribers for whom it may subsequently attempt delivery of messages.

In one embodiment, the inter-working means comprises means for translating user-originating requests for configuration of stored supplementary service data into a format recognizable by a cellular network acting as a primary data store for that subscriber, or by intelligent network equipment.

In another embodiment, the inter-working means comprises means for applying priority to registered devices and for routing services according to preferences and capabilities of those devices and the available networks.

In one embodiment, the server comprises means for receiving VoIP call setup requests in a user device mobility event notify package and for originating a call to a called device.

In one embodiment, the server comprises means for receiving from a user device a notification of requested hand-over, the notification being part of a mobility event package, and means for transmitting to the user device a temporary reference number in response.

In one embodiment, the server comprises means for receiving in a mobility event package from a user device capability data for the device, and the inter-working means comprises means for using said date for delivery of messages to said device.

In one embodiment, the inter-working means comprises means for maintaining user device presence indications upon receipt of device notifications in mobility event packages.

In another aspect, the invention provides a computer readable medium comprising software code for performing operations of any gateway as defined above when executing on a digital processor.

DETAILED DESCRIPTION OF THE INVENTION

Brief Description of the Drawings

The invention will be more clearly understood from the following description of some embodiments thereof, given by way of example only with reference to the accompanying drawings in which:

FIGS. 3 to 11 are sample call flows, in which the gateway is referred to as "AccuROAM"

DESCRIPTION OF THE EMBODIMENTS

A glossary of terms in this specification is provided at the end of the description of the invention.

Figure 1:
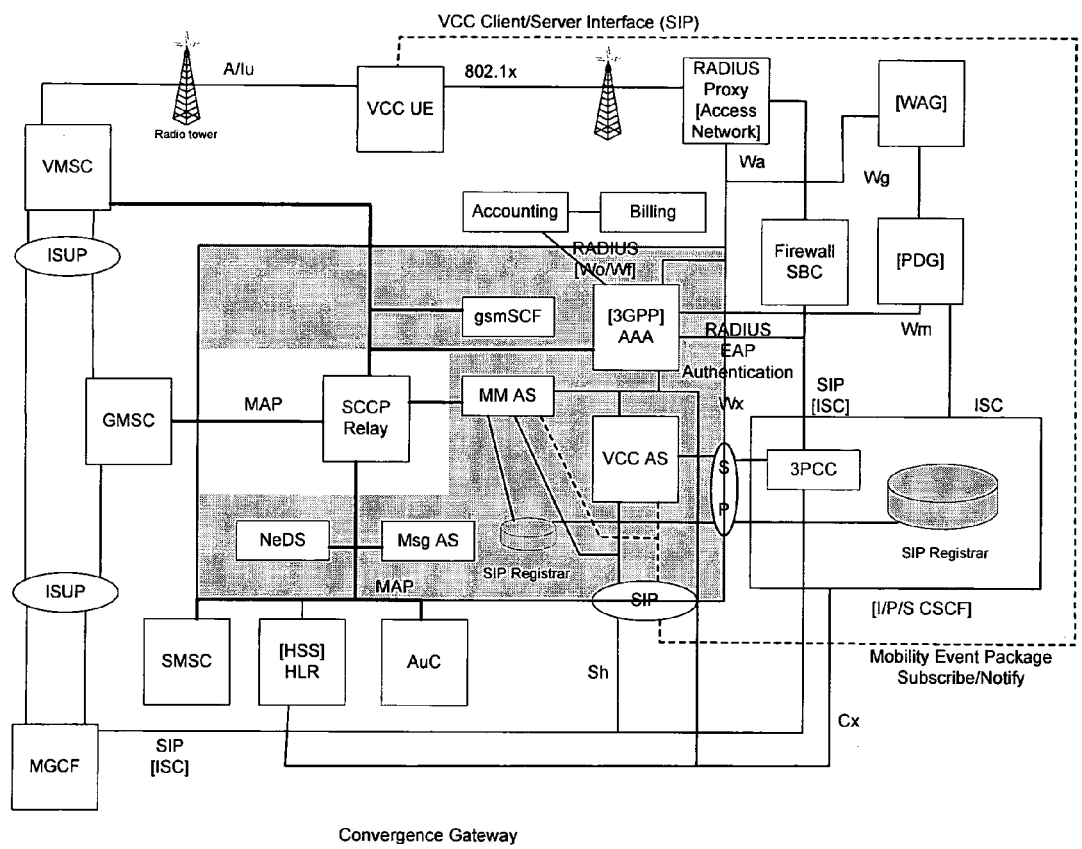
FIG. 1 is a representation of a roaming gateway of the invention, for pre-IMS and IMS roaming, in which the gateway comprises the components in the shaded portion of the diagram.
Figure 2:
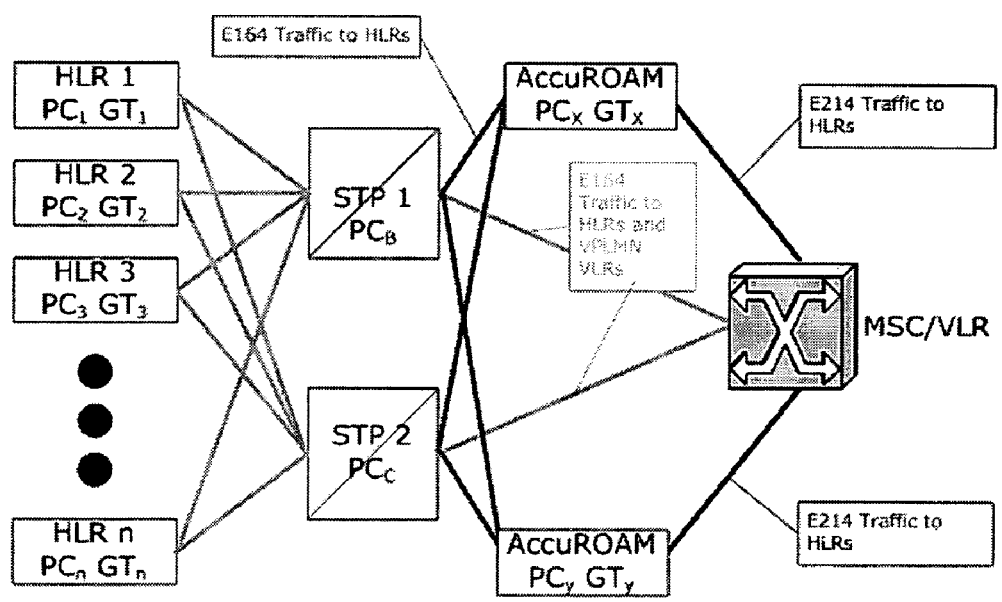
FIG. 2 is a diagram showing position of the gateway in relation to networks.

A convergence or roaming gateway of the invention is shown in FIG. 1 and the context in which it operates is shown in FIG. 2, connected to cellular network elements, such as STPs, HLRs, VLRs, MSCs. It is a redundant, N-Way gateway in its deployment and handles subscribers homed at various HLRs and HSSs. The components of the gateway (gsmSCF, AAA server, SCCP Relay, NeDS, Msg AS, MM AS, VCC AS, SIP Registrar) when deployed in either a SIP environment or an IMS environment (IMS components signified by '[ ]') are shown. Also shown are the interfaces in use in either environment; SIP, RADIUS and MAP for SIP environment and ISC, DIAMETER (Wx, Wg, Wm, Wa, Wo, Wf, Sh, Cx), RADIUS and MAP for an IMS. environment.

The gateway is a convergence gateway allowing operators who are introducing SIP signalling and Internet telephony network elements into a 2.5/3G network to gracefully migrate the network to a fully SIP-enabled IP Multimedia Subsystem. It provides a high availability cluster environment that supports automatic failover and recovery in the event of a failure at either the UNIX process level or computing element level. It provides an application framework which provides common Operations, Administration, and Maintenance (OAM) functions including provisioning, event logging, measurements collection, and gateway management using MML, GUI, or SNMP remote access interfaces. The application framework creates a highly reliable and scalable solution.

The above inter-working functions communicate with user devices in an IP network according to a machine-level subscribe-and-notify event package protocol for managing handover of mobile devices roaming between IP and cellular networks. They also poll a cellular network for subscriber status on that cellular network in the absence of a mobility event package. The inter-working functions comprise HSS functionality programmed to access data on a HLR of a cellular network and to perform HSS operations using said data. The gateway applies routing policies specific to call types, allowing or disallowing the anchoring of calls originating in either an IP network or a cellular network based on number prefixes. The inter-working functions comprise an application server programmed to communicate with a user device as a client. The server provides a staging point for cellular supplementary services while anchoring calls, retrieving configurations from cellular network elements and applying appropriate routing based on these configurations and the current state of a call.

In migration from the traditional GSM/GPRS core network to the fully enabled SIP network, the CS/PS subscriber profile is assumed to reside in the existing MAP-based HLR/AuC. It is assumed that the mobile subscriber has a single number which belongs to the circuit switch domain.

The main elements of the gateway of FIG. 1 are described below.

The server "VCC AS" component performs the important role of managing server-led handover even if it is WiFi-WiFi handover or handover between any two types of IP network.

The AAA Server component provides Authentication, Authorization and Accounting in accordance with 3GPP WLAN Inter-working requirements as specified in 3GPP 33.234 and including extensions specified herein.

The SIP Registrar component performs $3^{rd}$ Party SIP authentication of a subscriber when roaming in a WiFi access network. The SIP subscription resides within the SIP Registrar/Call Controller. The SIP Registrar sends a third-party registration to the SIP Registrar. In IMS this is replaced by S-CSCF infrastructure.

The MM-AS (mobility management application server) component is a SIP application server providing mobility management functions for subscribers who are registered within the IMS domain and who may not be registered in the CS domain. The MM-AS may behave like an MSC/VLR to the HLR. It is assumed that the dual mode handsets support multiple active radio technologies but the subscriber may wish to use only the WiFi interface when cellular coverage is poor (or non-existent) or the subscriber is stationary within a WLAN zone. The MM-AS also caters for "data only" cards, which do not support connection to the circuit switch domain. On SIP registration, the MM-AS sends a SIP notification to the UAC, requesting current radio status, handset and capabilities. Alternatively, the MM-AS can act as an LCS server depending on VCC terminal capabilities and support for location-based services within the SS7 network. The MM-AS can use location information to intelligently track dual mode handsets within the circuit switch domain. Additionally, the MM-AS may detect the availability of a subscriber on CDMA, GSM or GPRS networks by polling the HLR for the subscriber's status, using a relevant method for the bearer (FIG. 13):

CDMA: Profile Directive
GSM: Send Routing Information
GSM: Send Routing Information for Location Service
GSM: Anytime Interrogation The VCC-AS (voice call continuity application server) provides functionality including that specified in 3GPP 23.204. It allows for the anchoring of voice calls originating from or destined to either the CS or IMS networks, such that at a point in a call's lifetime the call may seamlessly transition between CS and IMS networks.

In order to facilitate control of the bearer path upon domain transfer, the VCC AS anchors user-initiated voice calls. The gsmSCF component supports circuit switch call anchoring via CAMEL based triggers, the subscribers CAMEL profile resides in the HLR. The original called party number along with other information required to complete the call is made available to the VCC-AS, such that the B2BUA can originate a call to the remote party on behalf of the VCC user.

Capability of anchoring of Emergency calls and CS calls other than voice calls (e.g. CS Data, CS Fax) may be specified at the time of anchoring according to operator or user policy. Anchoring of voice calls originating from or terminating to a subscriber that does not have a VCC UE or an active VCC subscription is subject to operator policy. For example the HLR CAMEL profile of a subscriber having a non-VCC UE may not be provisioned with the gsmSCF E.164 address. Calls that are not anchored are handled according to the normal CS call originating & terminating procedures.

The gateway incorporates signalling relay/router functionality as follows. In general, a MAP signal is sent from one network element to another. An intelligent signalling relay engine intercepts the operation and then can perform one of the following:

Relay the operation, unchanged, to the appropriate destination network element (e.g. HLR). In this case it simply acts as an SCCP routing node. Typically the signalling relay engine will use information in the SCCP header or even the MAP operation itself to determine the appropriate destination.

Relay the operation with changes in the payload.

Respond to the MAP operation acting as though it were the destination network element.

Whilst handling an operation, an intelligent signalling relay function may also send and receive other MAP operations and, indeed, interact with other network elements such as service control points and data points.

The SCCP Relay is an optional network element which routes HLR bound traffic to the NeDS (network domain selection) function for the purpose of tracking the location of VCC subscribers and providing a decision function for delivering a call either in the CS domain or in the VoIP domain.

The NeDS function acts as a virtual HLR for VCC subscribers. The gsmSCF, NeDS and VCC-AS interact to provide anchoring, domain selection and handover of CS and VoIP calls. VCC clients supporting Mobility Event Packages can notify the NeDS via the VCC-AS of terminal capability and whether or not the destination terminal is already CS-attached or SIP-registered. Depending on RF conditions, preference and subscription options the NeDS can determine whether an incoming CS call should be routed to the VoIP domain or whether a call currently in the VoIP domain should remain in VoIP or be transferred to CS.

The $3^{rd}$ Party Call Controller (3PCC) is a SIP domain server, which acts as a SIP Proxy for routing voice calls via the Media Gateway Controller (MGCF or Softswitch) and the Session Border Controller (SBC). The $3^{rd}$ Party Call Controller can offer supplementary services such as call forwarding, allowing the VCC subscriber the ability to forward incoming calls to another number if the VCC subscriber is not reachable, if they're busy, or if call forwarding is allowed unconditionally. Other services offered by the $3^{rd}$ Party Call Controller include:

Barring of outgoing calls, this service makes it possible for the VCC subscriber to prevent all outgoing calls.

Barring of incoming calls, allowing the VCC subscriber to prevent incoming calls.

Call hold, allowing the VCC subscriber to interrupt an ongoing call and then subsequently re-establish the call.

Multiparty service, the multiparty service enables a VCC subscriber to establish a multiparty conversation.

The Gateway within the IMS

In the migration from pre-IMS to IMS, the AAA becomes a 3GPP AAA supporting WLAN inter-working as defined in TS 29.234 and other related standards.

Typically, the WLAN user profile resides in the HSS. If, however, the operator continues to use a legacy HLR, the WLAN user profile may reside within the gateway. The parameters relating to the WLAN user profile are defined in clause 3B of TS 23.008. The WLAN user may have a separate I-WLAN MSISDN, however, it is expected that the WLAN user will use his/her Basic MSISDN when roaming in a WLAN.

Aspects of operation of the gateway are illustrated in the drawings, as follows.

Figure 3:
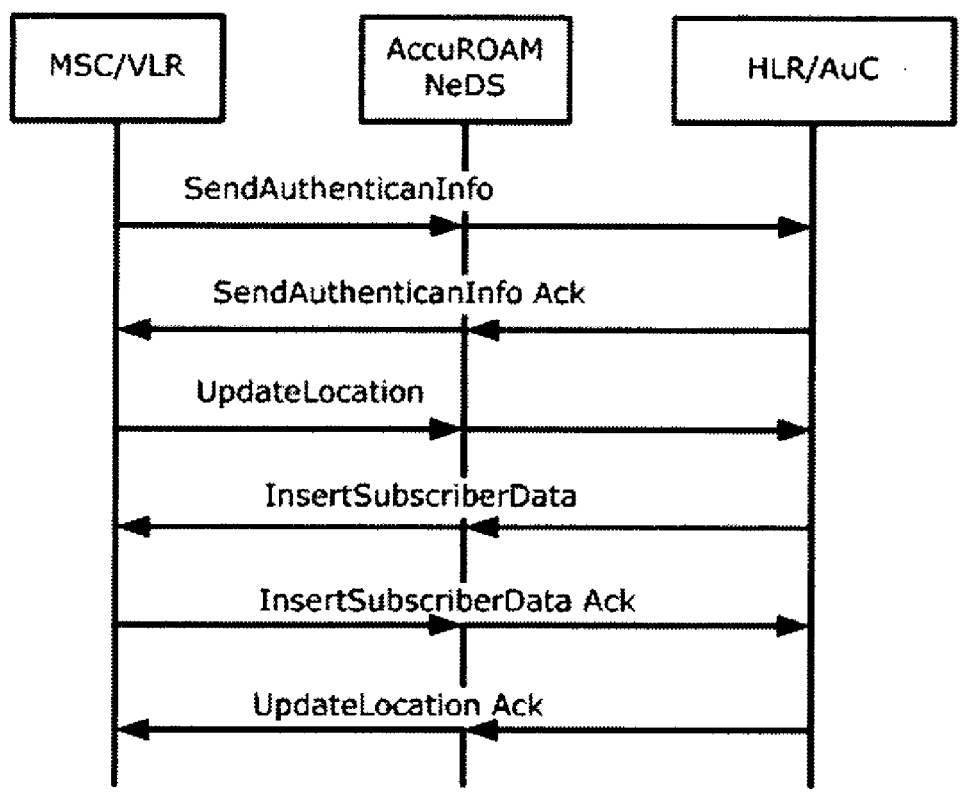

FIG. 3: NeDS relaying HLR bound traffic and recording location information. In this scenario the SCCP Relay is responsible for intercepting relevant MAP messaging for relaying into the NeDS component.

Figure 4:
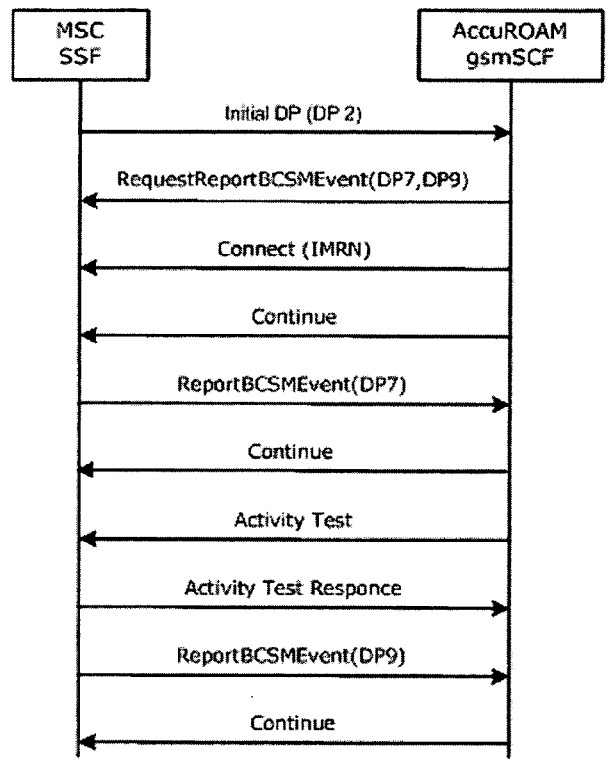

FIG. 4: gsmSCF redirecting an MO call. The originating circuit switch call is redirected to the VCC-AS.

Figure 5:
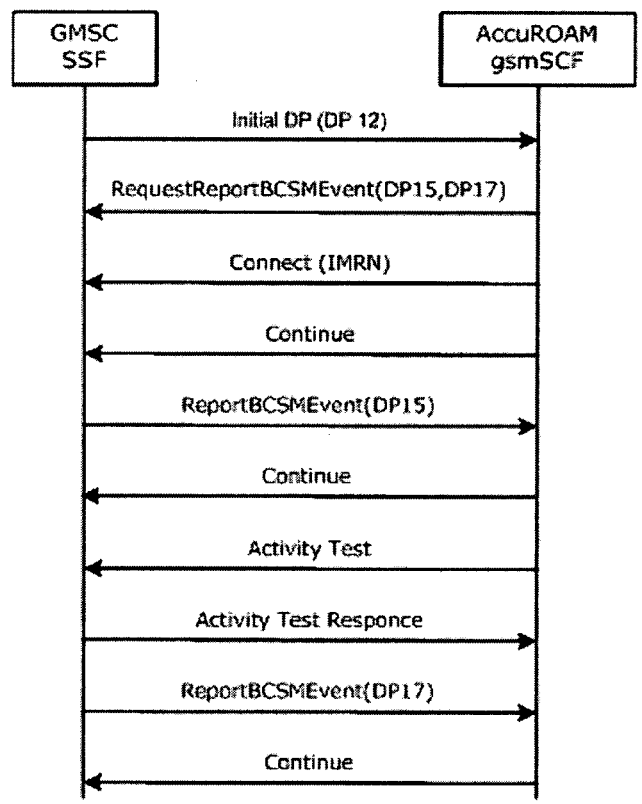

FIG. 5: gsmSCF redirecting an MT call. The terminating circuit switch call is redirected to the VCC-AS.

Figure 6:
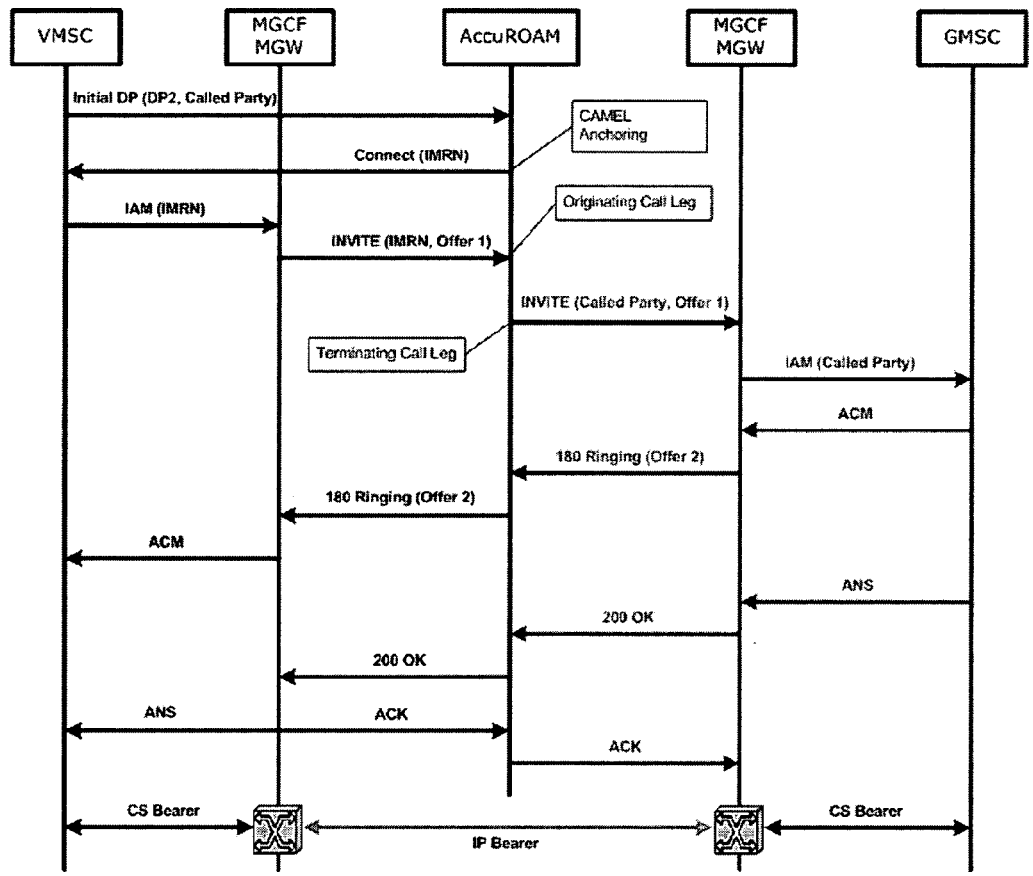

FIG. 6: Acting as a gsmSCF and B2BUA; anchoring a mobile originated circuit switch call and originating a VoIP call on behalf of the VCC subscriber.

Figure 7:
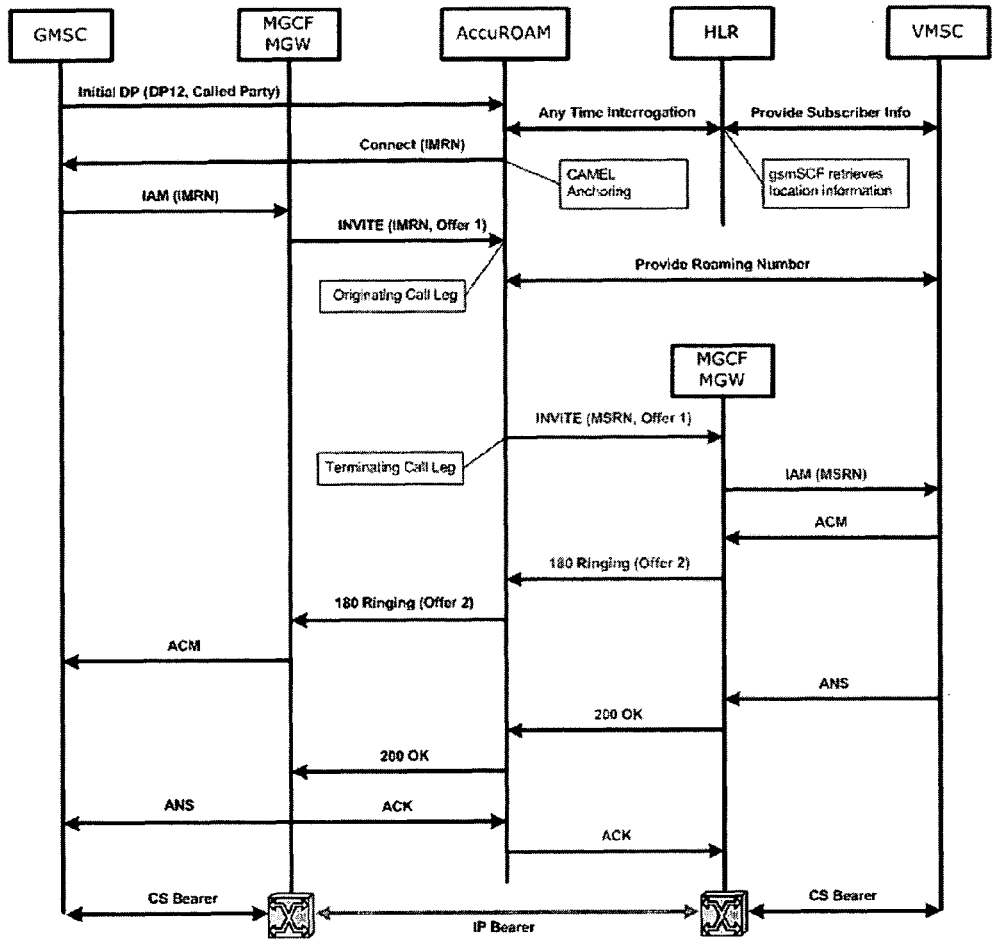

FIG. 7: Acting as a gsmSCF and B2BUA; anchoring a mobile terminated circuit switch call and originating a VoIP call towards the VCC subscriber. The MM-AS retrieves the MSRN from the serving VLR.

Figure 8:
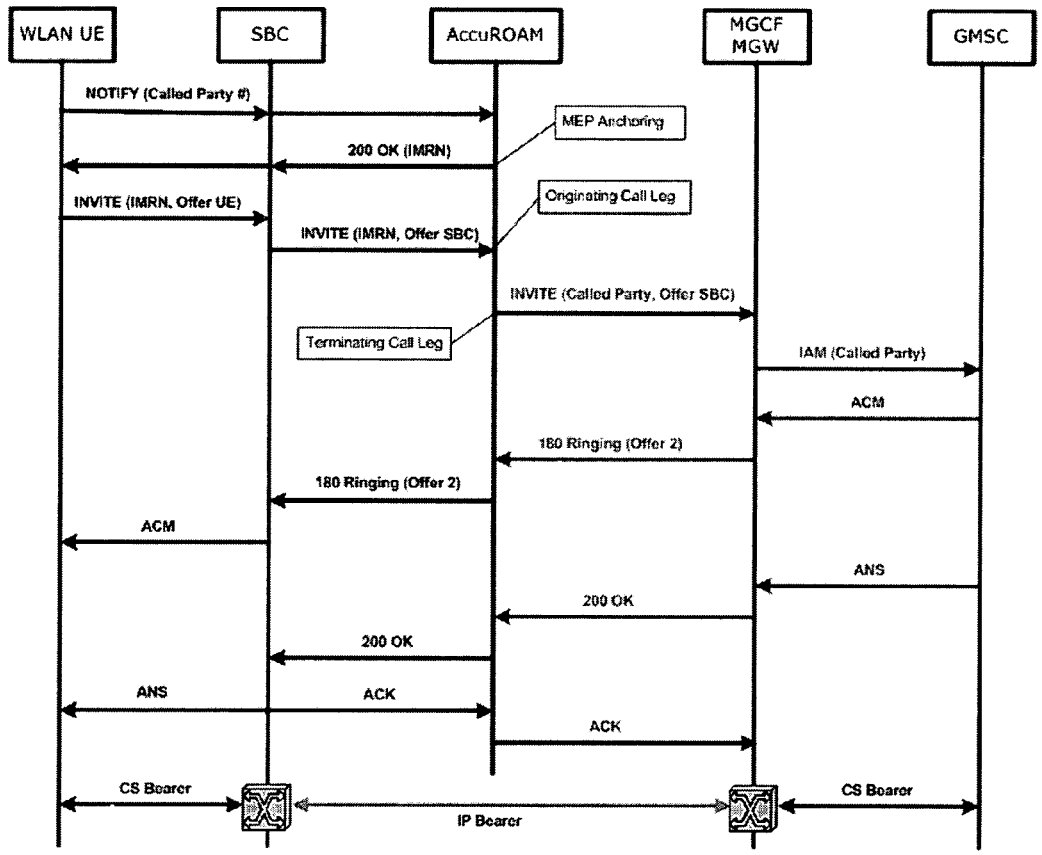

FIG. 8: Acting as a B2BUA; anchoring a mobile originated VoIP call on behalf of the VCC subscriber. The VCC client requests call setup using a MEP NOTIFY.

FIG. 9: Acting as a B2BUA; anchoring a mobile originated VoIP call on behalf of the VCC subscriber. The non-VCC client requests call setup using an INVITE which is routed (via SIP intermediaries) to the gateway VCC-AS. The gateway NeDS will decide upon the terminating network i.e CS or IP. In the case where a VCC client requests call setup to another VCC client, the MEP notify is first sent to the VCC-AS.

Figure 10:
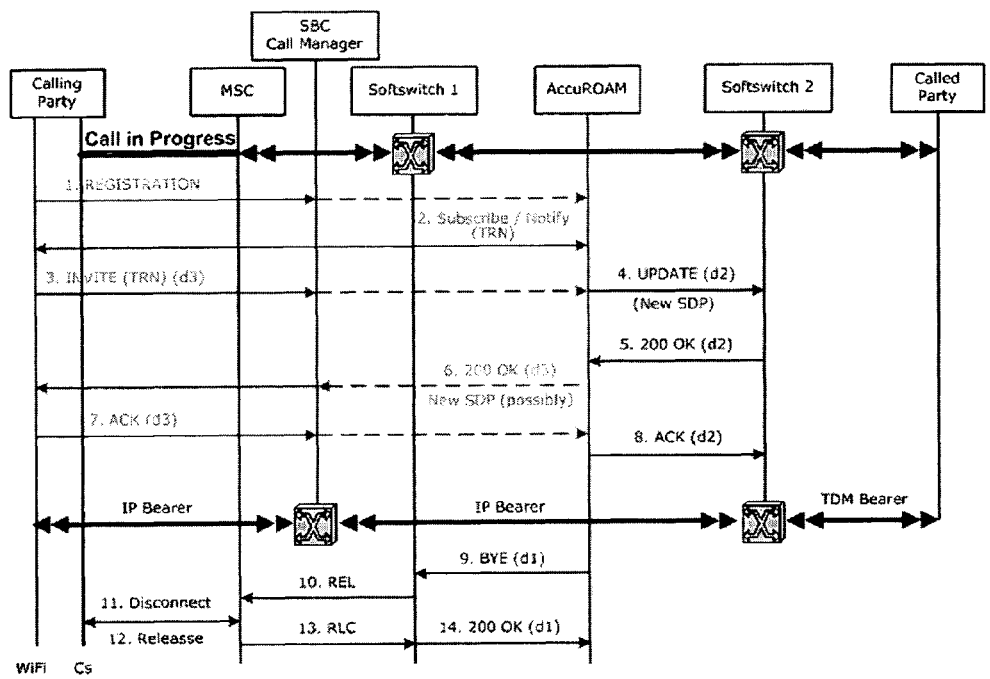

FIG. 10. Acting as VCC-AS, provide the VCC client with a Temporary Reference Number (TRN) to facilitate the establishment of a VoIP call between Called Party→SBC→Softswitch 2 and the tearing down of the circuit switch call between Called Party→MSC→Softswitch 1→Softswitch 2

Figure 11:
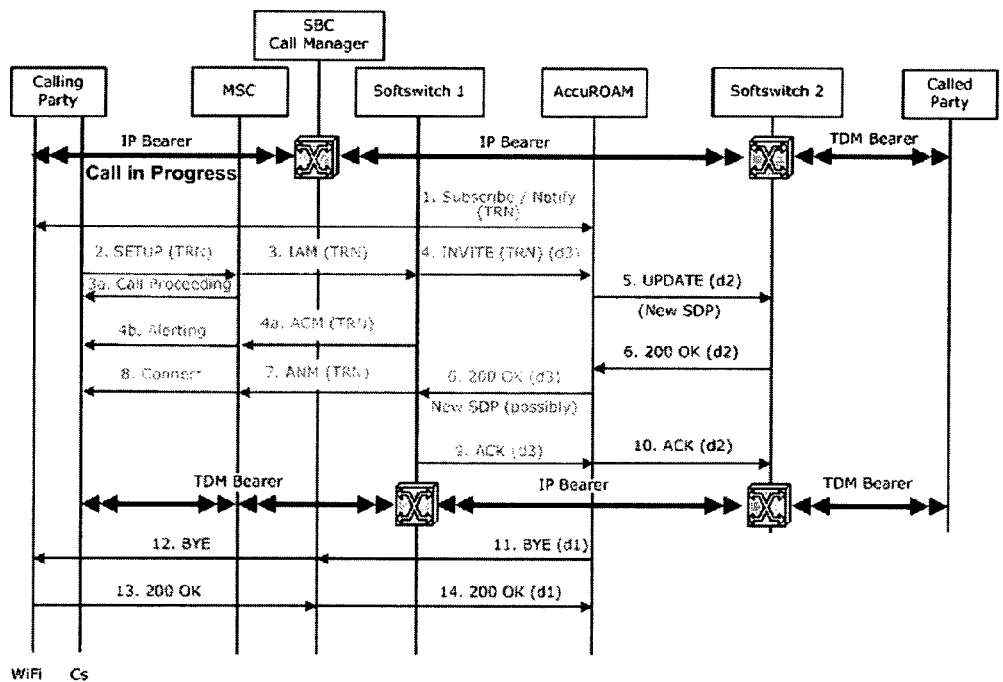

FIG. 11: The VCC-AS provides the VCC client (user device) with a TRN to facilitate the establishment of a circuit switch call between Called Party→MSC→Softswitch 1→Softswitch 2 and the tearing down of the VoIP call between Called Party→SBC→Softswitch 2.

Figure 12:
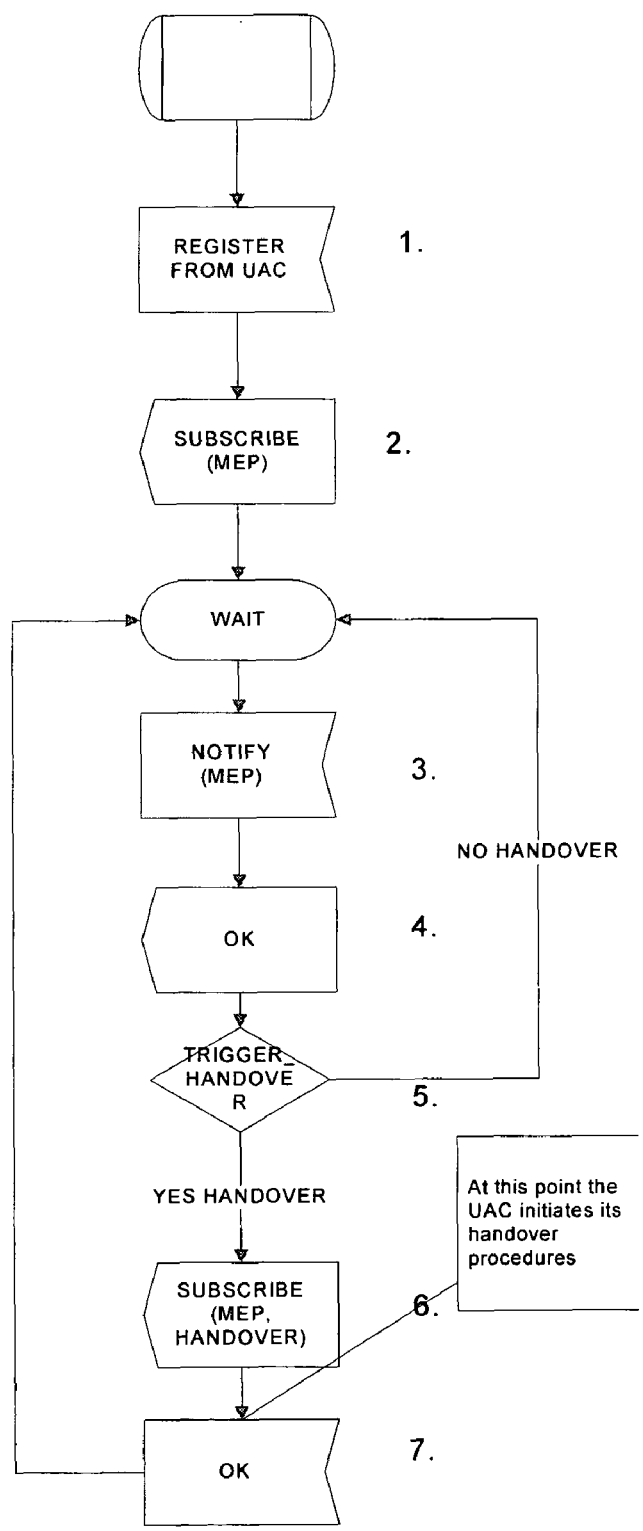
FIG. 12 is a flow diagram for handover decision making.

FIG. 12 is a call state diagram for hand-over, showing the following steps:

1) The initial Registration is received to the platform which starts the session.
1) The platform and UAC exchange subscriptions for mobility event packages
2) Notifications are exchanged which contain data relating to UAC environment and preferences as stored within the network. This allows the NeDS to include UAC environment information in criteria that it may use for service provision. Similarly the UAC may use information from the platform to influence its application behaviour 3) A notification from the platform may include a notification to the UAC to trigger a handover for a call already in progress.
4) A new subscription occurs, to satisfy the subscribe/notify state machines on the UAC and platform
5) The UAC causes the handover procedures to be implemented and the call is moved to the alternate radio.

Figure 13:
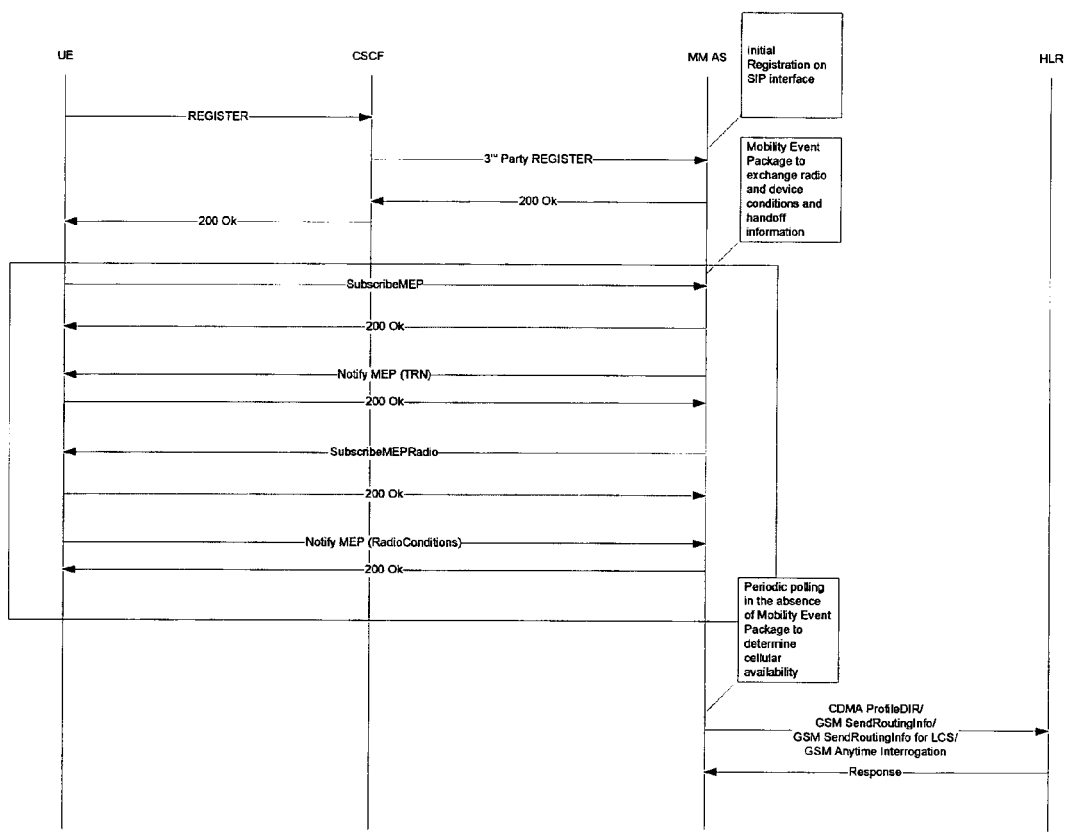
FIGS. 13 to 17 are sample call flows, again in which the gateway is referred to as "AccuROAM".

FIG. 13: Determination of subscriber's cellular availability by:
a) exchange of information from device detailing radio conditions it is experiencing and allowing it to receive indications from MM AS such that further call processing is affected by NeDS preference
b) polling Cellular infrastructure in the absence of MEP such that NeDS can use cellular availability as criteria for further call processing FIG. 14: The gateway indicating to UE preference for Mobile Originated message deliver, causing MO messages delivery to MsgAS in the gateway, which can then transcode and deliver to an SMSC. The gateway includes First Delivery Attempt mechanism to B-Party. Even without Policy coordination between the gateway and the UE, the gateway can still receive MO Messages and transcode for delivery to SMSC FIG. 15: The gateway acting as a proxy VLR or proxy SGSN relays a short message from SMSC to a UE that is present on SIP. The gateway transcodes between cellular messaging formats and SIP messaging formats. The decision on path to take for final delivery stage is dependent on NeDS criteria decision.

Figure 16:
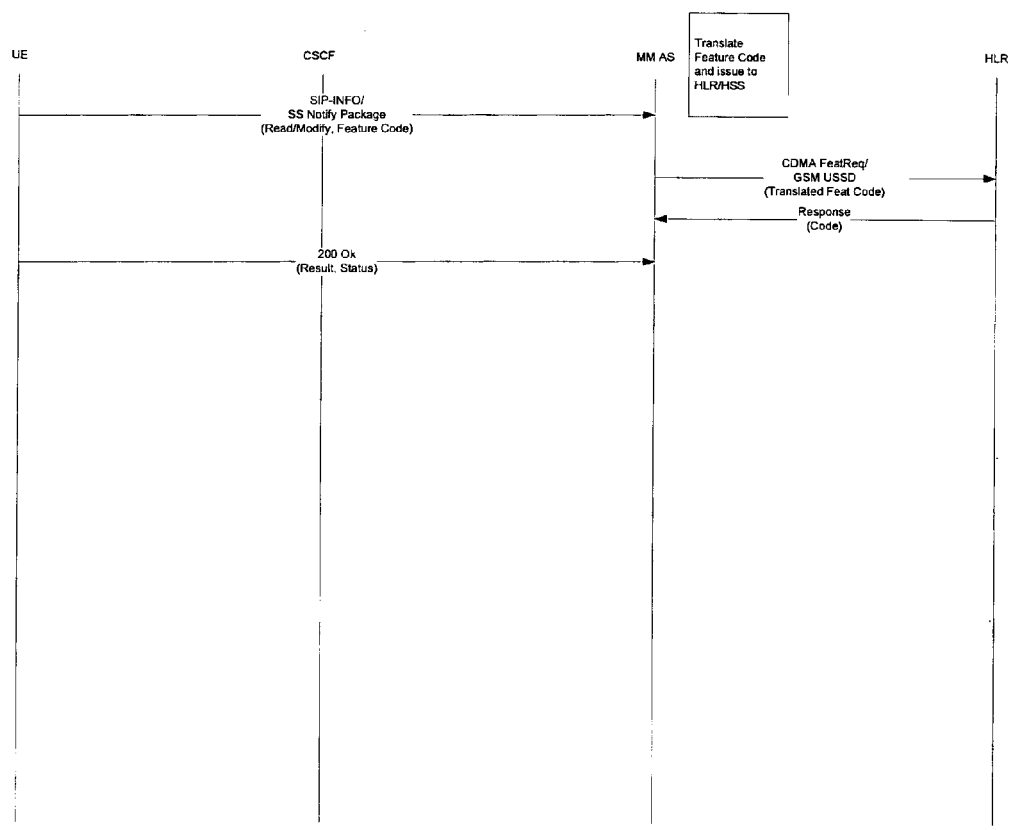

FIG. 16: The gateway acting as a translation function for changing HLR/HSS (or other IN services) based supplementary service configurations subject to user interaction while the device prefers to update based on SIP methods.

Figure 17:
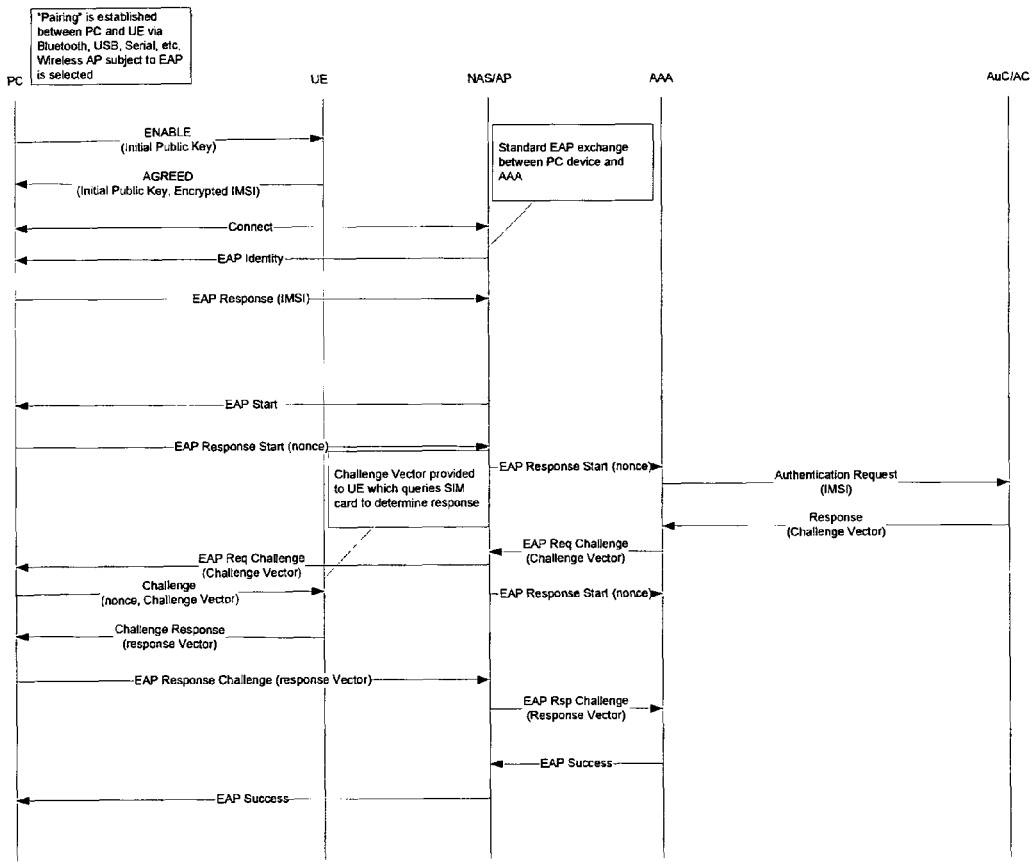

FIG. 17: UE acts as an authentication dongle for providing response to challenge vectors during EAP exchange with AAA platform, to allow PC to support EAP-SIM and EAP-AKA methods, without additional hardware requirement of SIM card reader and complexity of inserting the SIM card from existing UE or managing multiple UE.

The following describes aspects of operation of the gateway in more detail.

CS Registration via Network Decision Function (NeDS).

Referring to FIG. 3, the NeDS resides between the current serving VLR and the VCC subscriber's HLR. E214 signals (e.g. SendAuthenticationInfo, UpdateLocation) are directed towards the gateway via a Global Title Translation (GTT) within the SS7 network. Intelligent SCCP relays within the SS7 network can route VCC subscriber signals to the NeDS application. In this interception, the gateway can determine the availability of a subscriber on cellular networks and specific information about the cellular network in which the subscriber is present.

In HLR gateway mode, the NeDS acts as the subscriber's HLR; terminating all signals from the serving VLR and originating a new signal to the real HLR. The NeDS appears to the HLR as the current serving VLR or SGSN. This information may later be used to route calls to a subscriber. The criteria for routing a call to a subscriber is subject to criteria including:
Roamed in Cellular or Wireless network
Time of day
Quality of service of available networks
Number of subscribers and ongoing calls in available networks
Rating of subscriber according to tariff plan
Interaction with a 3GPP policy charging node
Interaction with other Intelligent Networking equipment in the operators' network Anchoring of Calls Anchoring refers to redirecting a call from either IMS or circuit switched domains via an intermediary node, for the purposes of applying further application logic to the call during its lifetime.

Essentially a call is made from a node (either UE or network node) and is destined to a B-Party. The network redirects the call due to a CAMEL Interaction or according to a SIP routing criteria in the CSCF infrastructure to the gateway. The call between the originator and the gateway is known as Leg-A. Subsequently the gateway applies its application logic and commences a new call to the original B-Party, this is referred to as Leg-B. The entire anchored call is considered to be the media path between Leg-A and Leg-B and the call state machine in progress at the gateway and the gateway is the point of anchoring.

CAMEL Based Anchoring of VCC Calls

The CAMEL procedures used to enable Voice Call Continuity call anchoring are defined in 3GPP 23.204. An extension is proposed where a unique IMRN is provided from the VCC AS at the time of call anchoring. This enables the gateway to identify cellular call legs independent of the availability of caller-id at the media gateway.

CS Terminated Call Anchoring Using CAMEL (FIG. 11)

If the WLAN enabled UE is in a location where VCC is possible and desirable, the gsmSCF provides an IMRN to the visited MSC to reroute the call toward the VCC-AS.

The gsmSCF requests location information from the HLR.

The MM-AS uses the location information received in location query from the HLR, to query the cellular serving VLR for a valid Mobile Subscriber Roaming Number (MSRN).

The VCC-AS uses the called party information, the IMRN and the MSRN to terminate a call to the VCC subscriber on behalf of the originator. This sequence is shown in FIG. 5.

VoIP-Originated Call Anchoring Using MEP (FIG. 12)

The VCC client shall request VoIP call setup using a Mobility Event Package NOTIFY. If the WLAN enabled UE is in a location where VCC is possible and desirable, the VCC-AS provides an IMRN to the visited VCC client to route the call toward the VCC-AS. The VCC-AS uses the called party information received in the MEP NOTIFY to originate a call to the remote party on behalf of the user.

VoIP-Terminated Call Anchoring Using SIP Routing (FIG. 8, 9)

The non-VCC client shall request VoIP call setup using the SIP INVITE method. All VCC subscriber INVITEs are routed via SIP intermediaries to the VCC-AS.

The non-VCC client requests VoIP call setup using the SIP NOTIFY method. The VCC-AS uses the called party information received in the MEP NOTIFY to originate a call to the remote party on behalf of the user.

Depending upon the location of the VCC called party, the NeDS will decide upon the terminating network.

Voice Call Continuity from CS to VoIP (FIG. 10)

Should the VCC client wish to perform handover, the VCC client shall send a notification as part of the Mobility Event Package (MEP) requesting a Temporary Reference Number (TRN).

If the subscriber is in a location where VCC is possible and desirable, the NeDS will provide a handover number in response to the MEP notification.

The VCC client forwards an INVITE (To: TRN#) to the gateway, where the half dialogs are manipulated and the media endpoints changed by use of the SIP-UPDATE method.

Voice Call Continuity from VoIP to CS (FIG. 11)

Should the VCC client wish to perform handover, the VCC client shall send a notification as part of the MEP requesting a TRN.

If the subscriber is in a location where VCC is possible and desirable, the NeDS will provide a handover number in response to the MEP notification.

The VCC client shall initiate a circuit switch call to the TRN number.

The serving MSC shall route the call via Softswitch 1.

Softswitch 1 shall forward an INVITE (To: TRN#) to the gateway, where the half dialogs are manipulated and the media endpoints changed using the SIP-UPDATE method.

The gateway provides seamless voice call continuity with decisions implemented within the IMS and CS infrastructure. To facilitate this, the gateway exchanges information with the UAC on the UE such that the UAC can implement VCC and inform of changing conditions. The gateway issues a SIP-SUBSCRIBE method to the UAC and the UAC updates with radio conditions and call states. The gateway also uses SIP-SUBSCRIBE to trigger handover.

The following describes the protocol for machine-level communication between the VUAS server and the user devices to allow server-led handover decisions to be made.

Basic Payloads

In general the Subscribe/Notify mechanisms are as specified in RFC3265. Examples of the complete messages are defined below.

Initial SUBSCRIBE

---

SUBSCRIBE sip:27201123456789@bobspc.accuris-networks.com SIP/2.0
...
Event: mobility_event_package
Accept: application/xml
...

---

The "Event:" header specifies the name of the mobility event package

The "Accept:" header indicates the information required in the Notify response, for the mobility event package this is an XML document The 200 OK response is standard.

NOTIFY from UAC

---

NOTIFY sip:27201123456789@accuris-networks.com SIP/2.0
...
Event: mobility_event_package
...
Content-Type: application/xml
Content-Length: ...
<?xml version="1.0" encoding="UTF-8"?>
<VCC>
<Calls>
 <CallInProgress Bearer="IMS" CdPA="<tel:+353861234568@accuris-networks.com>" State="ACTIVE"></>
</Calls>
<WifiSignal RxSignalPwrStrength="100"
TxSignalPwrStrength="100" RTP-
  Stream-Quality="100"></>
<GSMSignal Strength="100"></>
</VCC>

---

The XML document is specified as follows:

VCC Subtree—mandatory containing:

Calls Subtree—mandatory providing details of the call in progress, its current bearer and the current Called Party Address WiFi Signal Details—mandatory, current percentage strengths for transmit and receive and signal quality of RTP stream GSM Signal Details—mandatory, current percentage strength from cellular modem The 200 OK response is standard.

The Mobility Event Package may also be used to convey attachment to Cellular radio as specified in the following payload. This allows the gateway to determine whether it needs to register with the cellular core network on behalf of an unattached device.

NOTIFY including Radio Availability from UAC

---

NOTIFY sip:27201123456789@accuris-networks.com SIP/2.0
...
Event: mobility_event_package
...
Content-Type: application/xml
Content-Length: ...
<?xml version="1.0" encoding="UTF-8"?>
<VCC>
 <WifiSignal RxSignalPwrStrength="100"
 TxSignalPwrStrength="100" RTP-
   Stream-Quality="100"></>
 <CellSignal Strength="0" Available="False"></>
</VCC>

---

The XML document is specified as follows:

VCC Subtree—mandatory containing:

WiFi Signal Details—mandatory, current percentage strengths for transmit and receive and signal quality of RTP stream CellSignal Details—mandatory, current percentage strength from Cellular modem, optional "Available" field indicating whether the device is currently attached to Cellular RAN.

Subsequent SUBSCRIBE

The gateway will use a subsequent SUBSCRIBE method to trigger a handover within the device

---

SUBSCRIBE sip:27201123456789@bobspc.accuris-networks.com SIP/2.0
...
Event: mobility_event_package; cs_handoff
...

---

The Event: header will contain the value mobility_event_package. Additionally in the subsequent SUBSCRIBE the value may contain either of the parameters "cs_handoff" or "ims_handoff" to indicate a handoff to that specific bearer.

Messaging Support

Messaging support within the gateway is designed such that the user retains a single user experience while at the same time leveraging existing network infrastructure for messaging and optimally using available networking resources between message delivery nodes. The goals of messaging features within the gateway can be described as:

To deliver messaging to and from single or dual mode FMC enabled devices, utilizing existing network infrastructure (HLR, VLR, MSC, xGSN, FDA, SMSC) and using optimized network infrastructure (WLAN)
  to apply preferred network selection decisions (from NeDS) to all messaging in customer network to achieve efficient use of network resources
  to appropriately encapsulate messages according to the target device and bearer capabilities It is understood that to achieve these goals, it is necessary for the gateway to overcome obstacles inherent in leveraging existing infrastructure and providing seamless user experience:
  how to optimally get messages to the gateway from existing messaging nodes in the network (specifically SMSC)
  how to reduce traffic to the gateway by only redirecting short messages of specific interest to the gateway While it is understood that many strategies for optimally receiving messages at the gateway may be due to network configuration, the gateway also proposes leveraging the following novel strategies:

For Mobile Originated messaging, by virtue of the Mobility Event Package, the device may communicate with the NeDS to determine the optimal path to deliver a message.

Figure 14:
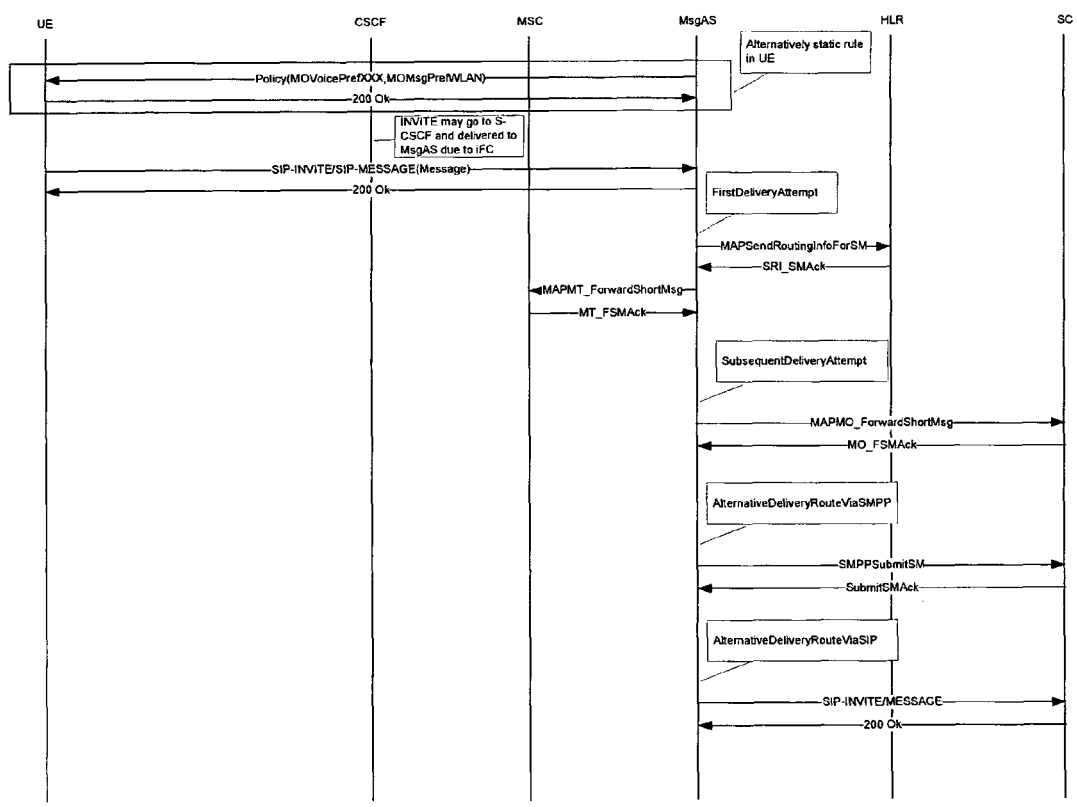
Figure 15:
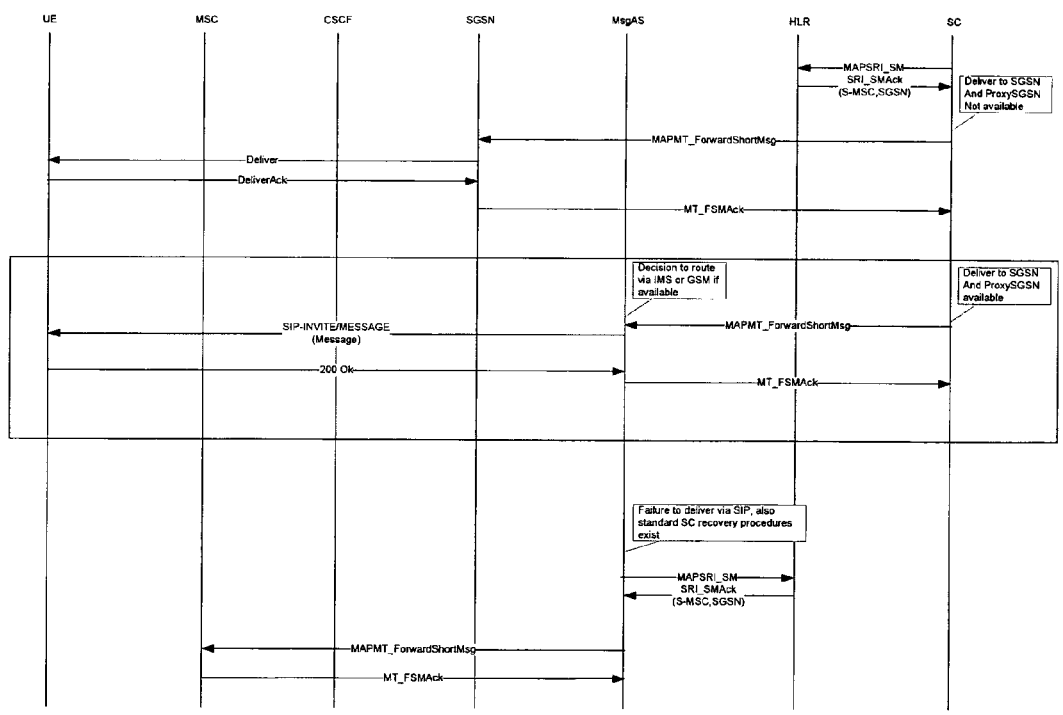

The message delivery in the MO case may either be via a standard MIME encoding, text based protocol or an encapsulation of the standard cellular mechanisms within a SIP message, either as a MIME attachment to a SIP-MESSAGE method, or as an MSRP stream within a session initiated via a SIP-INVITE method. The method of delivery and preferred encapsulation will be determined by the supportable methods available on the device. The gateway may include information that allows it to tailor messages specific to the supportable methods on the device (i.e. a database describing subscriber's terminal capabilities). Additionally the Mobility Event Package indications from the terminal may indicate to the gateway the preferred format of messages. This is illustrated in FIG. 14.

Upon receiving a message the gateway will facilitate an early delivery attempt of the outbound message, according to the expected destination. In the event of a delivery to a SIP or IMS end device the gateway will attempt to forward the message directly. In the event of a delivery to a device present in a cellular network, the gateway transcodes the message to the required encapsulation for cellular and issues the message to the relevant serving MSC. The gateway generates an appropriate billing event for the mobile originated subscriber for this first delivery attempt and will include details of time of attempt, source MSC, source WLAN AP, source address, destination address and details of NeDS criteria that applied to the delivery.

If it is determined that a first delivery attempt has not succeeded, the gateway will encapsulate the message as an originating message and deliver to the appropriate SMSC for the originating subscriber. To prevent double charging when the SMSC later attempts delivery, the gateway will flag the relevant billing event indicating that a delivery via SMSC will be attempted.

To optimally use available network resources, the gateway may also be configured to deliver messages to an SMSC via SIP, SMPP, UCP or other non-SS7 based messaging mechanism. The gateway transcodes the message from the received format to the required destination format.

For Mobile Terminated Short Message the SMSC is required to deliver a message via the gateway. This is achieved in a number of non-unique ways:

a. The HSS or HLR will forward the Cellular routing query (for GSM MAP SendRoutingInformation for Mobile Terminated ShortMessage, for CDMA SMS Request) which it receives from the SMSC to the gateway.
 b. The SMSC is configured to forward all Cellular routing queries to the gateway (static forward #1)
 c. The Gateway MSC is configured to forward all Cellular routing queries to the gateway (static forward #2)
 d. The STP is configured to forward all Cellular routing queries to the gateway There are also mechanisms to allow SMSC infrastructure to forward specific cellular routing queries to the gateway:
 1) The gateway will act as either Proxy VLR or Proxy SGSN (when in GSM context). This will allow the HLR/HSS to store the address of the gateway as a viable destination address when it responds to Cellular routing queries (illustrated in FIG. 15).
 2) Intercept all cellular routing queries destined for HLRs/HSSs that may be destined to subscribers of the service
 3) Define an interface to the SMSC that allows it to make a qualified decision on whether to send Cellular routing queries via the gateway or via HLR/HSS infrastructure/standard mechanisms Once the SMSC has issued the terminating short message delivery (in GSM via Mobile Terminated Forward Short Message and in CDMA via Short Message Delivery Point to Point), the gateway will determine the most appropriate route for onward delivery by querying its NeDS component. The criteria for this determination are equivalent to those used for determining the delivery path of a voice call.

When the path has been determined, if it is via standard Cellular means, the gateway will query the HLR to determine the actual serving MSC for the subscriber. It will then change the message appropriately for the onward delivery and issue to the serving MSC.

If the path is determined to be SIP/IMS based, the gateway will re-encapsulate the message into the required SIP-MESSAGE method, or initiate a SIP-INVITE session to the device's S-CSCF (having first queried the HSS for the appropriate S-CSCF if this information has not been previously stored within the gateway's datastore).

If the gateway fails to deliver via the SIP/IMS route, it may fallback to cellular mechanisms previously described, to deliver the message to the device.

The gateway will create a billing record for each stage in the delivery attempt, indicating when a double charge may be detected.

To maintain a viable bearer for "special" cellular messaging applications (MMS notifications, WAP push notifications, ringtones), the gateway will issue the messages with appropriate markup in the selected SIP METHOD to allow for the user agent to apply appropriate logic to the message to allow for further retrieval or processing of the message. The device will require special capabilities to understand this additional markup.

Supplementary Services

In order to provide a seamless user experience for other supplementary service, the gateway contains methods for retrieving subscriber information relating to Call Diversions and supplementary services from the subscriber's HLR/HSS. The gateway may interrogate the HLR/HSS for the following information:
 1) Call Forward Busy
 2) Call Forward Not Available
 3) Call Forward Not Reachable
 4) Call Forward Unconditional
 5) Call Waiting 6) Call Hold
7) Barring All Incoming Calls
8) Barring All Outgoing Calls
9) Barring All outgoing International Calls
10) Originating Caller Identification (Connected Line Identification)
11) Terminating Caller Identification (Calling Line Identification)

Stored information is then cached for further use for configurable periods of time, before a refresh takes place, to reduce signalling traffic to the HLR/HSS.

For call diversion, waiting and hold scenarios, the 3PCC implements state machines which detect when the service should be applied. This detection is based upon events in the network in which the call is active. In the event that a call is ongoing on SIP/IMS, the 3PCC may detect that the service should be applied. The profile as determined from the HLR/HSS is then used to apply the service. So, in a forwarding scenario, the appropriate forwarding number is used to reroute the call. In a Call Waiting scenario, the ongoing call may be put into a waiting state, if the service is active. In a Call Hold scenario, the ongoing call may be held if the service is active. In either Call Waiting or Hold scenarios, the relevant call may be dropped if the service is inactive (or the appropriate forwarding number used to redirect the voice channel).

The 3PCC also allows for supplementary services stored within the HLR to be updated, even when the subscriber is not available on the GSM network. Indeed, this feature may be used when the subscriber is available on the GSM network. An appropriately configured user agent will signal to the 3PCC an indication via SIP message that will include the information to be updated in the HLR/HSS. Similarly the user agent may request details of the current status of the supplementary service configuration in the HLR/HSS. The 3PCC will respond with the configuration encapsulated within a response that the user agent can display to the user through a standardized menu.

The gateway supports supplementary service interaction and editing in both GSM (including Unstructured Supplementary Service Data) and CDMA (including Feature Codes) modes. The information relating to changing supplementary service interaction may be carried in one of several ways including:

SIP-INFO package, as defined in rfc2976. An additional header is added which allows for the configuration string (such as is used in the native cellular technology: '*21#1234567') to be communicated to the gateway as-is.

SIP Notify package, e.g. as defined in rfc 3680, extending the schema to include fields bearing the configuration string (such as is used in the native cellular technology: '*21#1234567')

```
<?xml version="1.0"?>
  <reginfo xmlns="urn:ietf:params:xml:ns:reginfo"
    xmlns:xsi="http://www.w3.org/2001/XMLSchema-instance"
    version="0" state="full">
    <registration aor="sip:user@example.com" id="as9"
      state="active">
  <configuration set="*21#1234567"/>
    </registration>
  </reginfo>
```

The client on the UE includes a mechanism for generating these configuration strings from any menu system that it may use for representing the information.

As this is a two way communication mechanism, the gateway also encapsulates the response from the cellular technology in a format appropriate to the request method.

The gateway further extends manipulation of these feature codes by allowing them to be set from within its subscriber self-care graphical user interface. In this case, modifications to the features within the GUI trigger changes in the subscribers profile in the HLR, with the gateway generating the relevant cellular signals. These features may include signalling for:

Call me service
PrePay account check
Interaction with non-SIP enabled applications within the cellular networks intelligent network infrastructure.

The gateway may be configured such that it identifies some feature codes as manipulations to subscriber information when the gateway is acting as a PBX extension. In this instance, instead of signalling to the HLR, the gateway acts as a gateway to translate between the signalling mechanism on SIP and the required interaction on the PBX, such that the supplementary service is configured according to the subscribers preference. Similarly to the interactions on the cellular network, the following supplementary services are supported:

Call Forwarding services
Voicemail redirection
PBX Messaging
Multiparty conference
This is described in FIG. 16.
Secure Authentication of Non-SIM device Current proposals for implementation of AAA infrastructure within the SIP/IMS domain require a user terminal with a SIM card reader device, which then allows the use of EAP-SIM or EAP-AKA algorithms and methods to authenticate and authorize the subscribers access to the SIP/IMS network, leveraging the operator's authentication infrastructure to validate tokens stored within the SIM cards against those configured in the authentication infrastructure.

To facilitate the use of non-SIM enabled devices without the need for further hardware (such as external or attachable SIM readers) by leveraging equipment the subscriber already has available (their mobile terminal), we propose extending the authentication framework to paired devices.

The mechanism for communicating between the mobile terminal and the authenticating device include:
Bluetooth
WiFi
USB Cable
Serial Cable
Authenticating devices may include:
PCs
Laptops
In-Car User Interaction Systems
PDAs Upon configuring a client on the authenticating device, a relationship is established between the authenticating device and the mobile terminal which incorporates the SIM reading device. The initial establishment procedure includes an exchange of a public key between the two devices. This enables the devices to subsequently interact through encrypted and secured channels. The keying information exchanged may subsequently be replaced by keying information determined from the network authentication.

In a typical EAP-SIM and EAP-AKA interaction, the user identifier (IMSI) is read from the device and used to retrieve authentication vectors from the networks authentication infrastructure (as previously described). This keying information is then used by the SIM card algorithms to generate a challenge response which is provided to the AAA to authenticate and authorize the user.

In this scenario, the identity is provided to the authenticating device, which can then initiate the EAP-SIM/EAP-AKA session with the AAA. Upon receiving the challenge from the AAA, the authenticating device will supply the challenge to the mobile terminal, which can challenge the SIM card. The resulting challenge response is returned to the authenticating device, which subsequently issues it to the AAA. This is illustrated in FIG. 17.

Extensions to the AAA include allowing multiple devices to have authenticated with it concurrently. This enables multiple devices to leverage the same SIM information and each maintain concurrent sessions. Quality of Service procedures are applied to all sessions as if a single session were in use, allowing the network operator to allocate resources appropriately. An extension of this includes providing capability to treat some users with different QOS procedures, such that each terminal receives its own QOS profile.

Upon disconnection from the mobile terminal, the authenticating device must de-establish the related session with the AAA, disabling access to features of the network that require the user be authenticated. This ensures that multiple users do not use the same account for access to network resources.

Service Routing to Multiple and Non-Cellular Devices

The gateway supports service routing to multiple attached devices. When a user is attached from an authenticating device, the gateway can prioritize access to the user via that device, according to a configured preference.

The gateway will communicate with cellular infrastructure on behalf of clients that may not have cellular capabilities (i.e. will initiate mobility management procedures to HLR/HSS for PC, laptop, PDA and in-car systems and allow call and message routing to these devices based on the subscriber's cellular identity).

Included in the SIP/IMS registration information provided to the network, is an indication of the type of device attaching to the network. This information will be used to generate a prioritized list of contact points for the subscriber. This list is then used for routing services to the subscriber.

Any device may indicate to the gateway a "presence indication" which will allow the gateway to initiate an extended feature (such as a forwarding feature) if the user chooses to be unavailable.

The gateway may also be configured to contact all currently available devices when trying to establish a service session to a subscriber. This may result in a single call leg translating to multiple "forked" legs to all available devices. Once one of the devices answers the call request, call attempts are terminated to other devices.

Example Mobility Event Package

This example below describes a machine level notify-and-subscribe mobility event package exchange between a user agent and the gateway for the purposes of providing details about the user agent's operating environment (including radio conditions and potentially other information, such as supplementary service configurations).

Initial SUBSCRIBE

```
SUBSCRIBE sip:27201123456789@bobspc.accuris-networks.com SIP/2.0
Via: SIP/2.0/UDP registrar.accuris-
    networks.com:5060;branch=z9hG4bK1234567ab
To: Bob <sip:27201123456789@accuris-networks.com>
From: Bob <sip:27201123456789@accuris-networks.com>
Call-ID: 843817637684230@998sdasdh09
CSeq: 17766 SUBSCRIBE
Max-Forwards: 70
Event: mobility_event_package
Accept: application/xml
Contact: <sip:27201123456789@accuris-networks.com>
Expires: 600
Content-Length: 0
SIP/2.0 200 OK
Via: SIP/2.0/UDP bobspc.accuris-
    networks.com:5060;branch=z9hG4bK1234567ab
To: <sip:27201123456789@accuris-networks.com>;tag=ffd2
From: <sip:27201123456789@accuris-networks.com>;tag=xfg9
Call-ID: 843817637684230@998sdasdh09
CSeq: 17767 SUBSCRIBE
Expires: 600
Contact: <sip:27201123456789@accuris-networks.com>
Content-Length: 0
```

Example NOTIFY from UAC

```
NOTIFY sip:27201123456789@accuris-networks.com SIP/2.0
Via: SIP/2.0/UDP bobspc.accuris-
    networks.com:5060;branch=z9hG4bKna998sk
From: <sip:27201123456789@accuris-networks.com>;tag=ffd2
To: <sip:27201123456789@accuris-networks.com>;tag=xfg9
Call-ID: 843817637684230@998sdasdh09
Event: mobility_event_package
Subscription-State: active;expires=599
Max-Forwards: 70
CSeq: 8775 NOTIFY
Contact: <sip:27201123456789@accuris-networks.com>
Content-Type: application/xml
Content-Length: ...
<?xml version="1.0" encoding="UTF-8"?>
<VCC>
 <Calls>
  <CallInProgress Id="123" Bearer="IMS"
      CdPA="<tel:+353861234568@accuris-networks.com>"
      State="ACTIVE"></>
 </Calls>
 <WifiSignal RxSignalPwrStrength="100"
  TxSignalPwrStrength="100" RTP-
      Stream-Quality="100"></>
 <GSMSignal Strength="100"></>
 <Handover-Preference>Yes</>
</VCC>
SIP/2.0 200 OK
Via: SIP/2.0/UDP registrar.accuris-
    networks.com:5060;branch=z9hG4bKna998sk
From: <sip:27201123456789@accuris-networks.com>;tag=ffd2
To: <sip:27201123456789@accuris-networks.com>;tag=xfg9
Call-ID: 843817637684230@998sdasdh09
CSeq: 8776 NOTIFY
Content-Length: 0
```

Subsequent SUBSCRIBE indicating handoff of call to CS

```
SUBSCRIBE sip:27201123456789@bobspc.accuris-networks.com SIP/2.0
Via: SIP/2.0/UDP registrar.accuris-
    networks.com:5060;branch=z9hG4bK1234567ab
To: Bob <sip:27201123456789@accuris-networks.com>
From: Bob <sip:27201123456789@accuris-networks.com>
Call-ID: 843817637684230@998sdasdh09
CSeq: 17766 SUBSCRIBE
Max-Forwards: 70
Event: mobility_event_package; cs_handoff
Accept: application/xml
Contact: <sip:27201123456789@accuris-networks.com>
Expires: 600
```

-continued

```
Content-Length: 0
SIP/2.0 200 OK
Via: SIP/2.0/UDP bobspc.accuris-
    networks.com:5060;branch=z9hG4bK1234567ab
To: <sip:27201123456789@accuris-networks.com>;tag=ffd2
From: <sip:27201123456789@accuris-networks.com>;tag=xfg9
Call-ID: 843817637684230@998sdasdh09
CSeq: 17767 SUBSCRIBE
Expires: 600
Contact: <sip:27201123456789@accuris-networks.com>
Content-Length: 0
```

Subsequent SUBSCRIBE indicating handoff of call to IMS

```
SUBSCRIBE sip:27201123456789@bobspc.accuris-networks.com SIP/2.0
Via: SIP/2.0/UDP registrar.accuris-
    networks.com:5060;branch=z9hG4bK1234567ab
To: Bob <sip:27201123456789@accuris-networks.com>
From: Bob <sip:27201123456789@accuris-networks.com>
Call-ID: 843817637684230@998sdasdh09
CSeq: 17766 SUBSCRIBE
Max-Forwards: 70
Event: mobility_event_package; ims_handoff
Accept: application/xml
Contact: <sip:27201123456789@accuris-networks.com>
Expires: 600
Content-Length: 0
SIP/2.0 200 OK
Via: SIP/2.0/UDP bobspc.accuris-
    networks.com:5060;branch=z9hG4bK1234567ab
To: <sip:27201123456789@accuris-networks.com>;tag=ffd2
From: <sip:27201123456789@accuris-networks.com>;tag=xfg9
Call-ID: 843817637684230@998sdasdh09
CSeq: 17767 SUBSCRIBE
Expires: 600
Contact: <sip:27201123456789@accuris-networks.com>
Content-Length: 0
```

It will be appreciated that the gateway of the invention allows roaming between cellular networks and IP Based (WiFi, WiMax) Radio networks—using dual mode devices. The following are advantageous aspects:

(ii) it provides a signalling gateway between the two different networks, (iii) it provides a system whereby the cellular number of the dual mode device becomes the apparent identifier of the device—even when it is active on the WiFi network—but not on the cellular network, (iv) it provides a mechanism whereby the SIM provided by the cellular network can be used as the authentication for the user over the WiFi network as well as over the Cellular network, (v) it provides a means whereby the single user of the dual mode device can be active (using his single identifier) and using services on both networks simultaneously, (vi) it provides a means whereby the operator of a Converged service can control the users activity on either network, and can control which services he uses on which network, (vii) it provides a means whereby live calls can be kept active and handed over as the user roams either between the cellular network and the Wireless IP network, or even between two distinct Wireless IP networks, and (viii) it provides a means whereby the changeover from one network to the other is triggered either by the handset or by the network server—and can be triggered either because of failing network strength—or because of operator policy/preference.

The invention is not limited to the embodiments described but may be varied in construction and detail.

| Glossary | |
|---|---|
| Term | Description |
| 3GPP | Third Generation Partnership Project - Standards body responsible for GSM derived mobile standards |
| IMS | IP Multimedia System - Next Generation of standards defining mobile networks from 3GPP |
| WiFi | Wireless Fidelity - referring to wireless radio standards based upon IEEE 802.11 |
| LAN | Local Area Network - either wireless or wired |
| SIP | Session Initiation Protocol - standards defining signalling between nodes in IP networks |
| CDMA | Code Division Multiple Access - referring to current generation standards for North American Cellular networks based upon ITU and 3GPP2's standards |
| 802.15 | IEEE standard defining wireless radio for Bluetooth wireless data networks |
| GSM | Global System for Mobile communication |
| EDGE | Enhanced Data GSM Environment - extensions to GSM for increased data capability |
| GPRS | General Packet Data Service - extensions to GSM for increased data capability |
| UMTS | Universal Mobile Telecommunications System - Next Generation telecommunications originally standardised by ETSI in Europe |
| IETF | Internet Engineering Task Force - standards body defining base IP protocols, including SIP. |
| CDMA2000 | $3^{rd}$ generation radio standard originally defined by ITU |
| ITU | International Telecommunication Union - standards body |
| STP | Signalling Transfer Point - a node in a telecommunications network that acts as a gateway for signalling messages |
| HLR | Home Location Register - Primary data store for subscriber profile in a cellular network |
| HSS | Home Location Register - Primary data store for subscriber profile in a 3g cellular network |
| VLR | Visitor Location Register - Cache data store for a subscriber profile for one or many MSC |
| MSC | Mobile Switching Centre - Switching gateway for signalling from a subscriber's terminal to other infrastructure within the cellular network |
| N-Way | Referring to a node that is physically scalable from one to many nodes |
| GsmSCF | GSM Serving Control Function - a node in a CAMEL based environment that receives triggers from the serving network and then provides application logic appropriate to the triggers |
| AAA server | Authentication, Authorization and Accounting - a node in a network that provides security and billing capabilities |
| SCCP Relay | Signalling Connection Control Part Relay - an SS7 based node/software that interprets SS7 messages at the SCCP layer and applies application logic to them, forwarding messages in which it is not concerned |
| NeDS | Network Decision Service - a software component that applies application logic to elements of a SIP call |
| Msg AS | Messaging Application Server - a SIP Application Server that handles messaging |
| MM AS | Mobility Management Application Server - a SIP Application Server that handles events relating to mobility management procedures that may be applied to a user's identity |
| VCC AS | Voice Call Continuity Application Server - a SIP Application Server that handles events relating to voice call continuity procedures including transition of calls between cellular and other domains (WiFi, WiMAX, 3GPP, Fixed IP etc.) |
| SIP Registrar | Primary Subscriber database for a subscribers active session and profile in a SIP based network |

-continued

Glossary

| Term | Description |
|---|---|
| RADIUS | Remote Authentication Dial In User Service - a protocol defined by IETF for authorization and accounting |
| MAP | Mobile Application Part - a GSM protocol, evolved for 3GPP, used throughout GSM cellular networks |
| ISC | IMS Service Control - an IP protocol based on IETF's SIP used as a control mechanism in IMS networks |
| DIAMETER | Evolution of the RADIUS protocol defined by IETF for authentication, authorization and accounting |
| Wx | Protocol used between 3GPP AAA and HSS |
| Wg | Protocol used between 3GPP AAA and WAG for exchange of policy information |
| Wm | Protocol used between 3GPP AAA and PDG |
| Wa | Protocol used between WLAN network and 3GPP AAA Proxy or server for user authentication |
| Wo | Protocol used between WLAN network and Online Charging Function |
| Wf | Protocol used between 3GPP AAA and Charging Gateway |
| Sh | Used to exchange profile information between HSS, Application Servers and CSCF |
| Cx | Used to exchange profile information between HSS, S-CSCF and I-CSCF |
| CSCF | Call Session Control Function - one of P-CSCF (Proxy), I-CSCF (Interrogating) and S-CSCF (Serving) |
| WAG | WLAN Access Gateway - Gateway between serving wireless network and 3G packet network |
| WLAN | Wireless LAN |
| PDG | Packet Data Gateway - gateway between wireless IP network and external (to the IMS) IP networks |
| MML | Man Machine Language - provisioning and operations interface |
| SNMP | Simple Network Management Protocol - used for providing events and alarms information to an operator |
| CS | Circuit Switched |
| PS | Packet Switched |
| AuC | Authentication Centre |
| UAC | User Agent Client - software on a device implementing user interface |
| UAS | User Agent Server - software on a server implementing server side protocols |
| LCS | Location Service - provides specific details of location of user's terminal according to information available |
| SS7 | Signalling System number 7 - signalling protocol |
| CAMEL | Customised Applications for Mobile networks Enhanced Logic - GSM protocol for defining services |
| B2BUA | Back to Back User Agent - A server that acts as a router, on one side it mimics a UAS, on the other side it mimics a UAC. Application logic is typically defined between the UAS and UAC. |
| E.164 | Diallable Numbering Plan for telephony networks |
| VoIP | Voice over IP - protocols for bearing voice calls over IP, including SIP for signalling/session establishment and RTP for conveying the voice channel |
| RTP | Real time Transport Protocol - IP protocol used for convey a voice channel |
| RF | Radio Frequency - referring to radio interfaces |
| MGCF | Media Gateway Control Function - gateway between circuit switched and packet voice networks |
| SBC | Session Border Controller - gateway between packet voice and data networks |
| MSISDN | Mobile Subscriber ISDN - E.164 based telephone identity for a subscriber |
| MO | Mobile Originated - a call or message originating from a user's terminal |
| MT | Mobile Terminated - a call or message destined to a user's terminal or identity |
| MSRN | Mobile Subscriber Roaming Number - a temporary number assigned to a subscriber by an MSC for the duration of a call destined to that subscriber |
| MEP Notify | Mobility Event Package Notify - a notification event issued as part of the mobility event package procedures to inform a node of a change in the environment |
| TRN | Temporary Reference number - a temporary number assigned to a subscriber by the platform for the duration of a call destined to that subscriber for the purposes of routing that call through the platform for anchoring purposes |
| SMSC | Short Message Service Centre - a database used for storing and relaying short text messages |
| UE | User Equipment - the user's terminal |
| IN | Intelligent Networks - referring to additional applications applied during provision of services to a user |
| EAP | Extensible Authentication Protocol - as defined by IETF for authenticating network sessions |
| EAP-SIM | EAP for Subscriber Identity Modules - as defined by IETF for applying a SIM card based algorithm to an EAP authentication exchange |
| EAP-AKA | EAP for Authentication and Key Agreement - as defined by IETF for applying a 3G SIM card based algorithm to an EAP authentication exchange |
| E.214 | Mobility Management Numbering Plan for telephony networks |
| GTT | Global Title Translation - Routing mechanism based on applying routing criteria to elements of a number, e.g. E.164 or E.214 number |
| SGSN | Serving GPRS Support Node |
| VUAS | Virtual UAS |
| XML | eXtensible Markup Language |
| RAN | Radio Access Network |
| xGSN | Either SGSN or GGSN |
| GGSN | Gateway GPRS Support Node |
| FDA | First Delivery Attempt node for short message transfer |
| MIME | Multipurpose Internet Mail Extensions - a mechanism for encoding different types of message parts [text, image, audio, video, etc.] into a single document |
| WLAN AP | WLAN Access Point - radio to IP gateway |
| SMPP | Short Message Point to Point - protocol for delivering short messages between nodes |
| UCP | Universal Computer Protocol - protocol for delivering short messages between nodes |
| PBX | Private Branch Exchange - a private telephone switch |
| USB | Universal Serial Bus - an IEEE specified cabling and signalling specification |
| QOS | Quality of Service - referring to procedures and protocols applied to share environmental quality conditions for radio, voice and data channels |
| PDA | Personal Digital Assistant - a handheld computer |
| VCC Client | A User Agent on the User's terminal implementing additional features to support Voice Call Continuity which is a client of the VCC AS in the network. |

The invention claimed is:

1. A roaming gateway comprising at least one IP network interface, and at least one cellular network interface, and an inter-working means for inter-working between a wireless IP network and a cellular network, wherein:
the inter-working means is adapted to communicate with user devices in an IP network according to a machine-level subscribe-and-notify event package protocol for managing handover of mobile devices roaming between IP and cellular networks, in which the gateway is adapted to conduct a SIP subscribe and notify method with a device, and said method causes the device to notify the gateway, receive an acknowledgement from the gateway, and to then subscribe by sending a mobility event package with payload content including details of calls in progress, current bearers, and both WiFi and cellular signal strengths, and in which the gateway is adapted to use a subscribe method to trigger a device handover to a specified bearer;

the inter-working means is adapted to poll a cellular network for subscriber status on that cellular network in the absence of a mobility event package;

the inter-working means comprises HSS functionality adapted to access data on a HLR of a cellular network and to perform HSS operations using said data;

the inter-working means is adapted to apply routing policies specific to call types, allowing or disallowing the anchoring of calls originating in either an IP network or a cellular network based on number prefixes;

the inter-working means comprises an application server adapted to communicate with a user device as a client of the server;

wherein the inter-working means is adapted to communicate with an SMSC in a cellular network to indicate a preference to receive messages for particular subscribers for whom it may subsequently attempt delivery of messages;

wherein the inter-working means is adapted to translate user-originating requests for configuration of stored supplementary service data into a format recognizable by a cellular network acting as a primary data store for that subscriber, or by intelligent network equipment;

wherein the server is adapted to receive in a mobility event package from a user device capability data for the device, and the inter-working means is adapted to use said data for delivery of messages to said device.

2. The roaming gateway as claimed in claim 1, wherein the server is adapted to provide a staging point for cellular supplementary services while anchoring calls, to retrieve configurations from cellular network elements, and to apply appropriate routing based on these configurations and the current state of a call.

3. The roaming gateway as claimed in claim 1, wherein the inter-working means is adapted to apply anchoring or handover criteria according to geographic location information relating to a current location of a subscriber, thereby avoiding tromboning.

4. The roaming gateway as claimed in claim 1, wherein the inter-working means is adapted to use a mobility event package to coordinate transfer of user-created messages between user devices and the gateway in mobile originating cases, and to translate this message for onward delivery.

5. The roaming gateway as claimed in claim 4, wherein the inter-working means is adapted to include event package formatting and bearer information.

6. The roaming gateway as claimed in claim 4, wherein the inter-working means is adapted to obtain formatting and bearer information from a cellular network and from configuration settings.

7. The roaming gateway as claimed in claim 1, wherein the inter-working means is adapted to act as a proxy VLR and as a proxy SGSN for the purposes of intercepting relevant mobile terminated voice calls or messages from a cellular network, for a subsequent delivery attempt via IMS protocol.

8. The roaming gateway as claimed in claim 1, wherein the inter-working means is adapted to apply priority to registered devices and to route services according to preferences and capabilities of those devices and the available networks.

9. The roaming gateway as claimed in claim 1, wherein the server is adapted to receive VoIP call setup requests in a user device mobility event notify package and to originate a call to a called device.

10. The roaming gateway as claimed in claim 1, wherein the server is adapted to receive from a user device a notification of requested hand-over, the notification being part of a mobility event package, and to transmit to the user device a temporary reference number in response.

11. The roaming gateway as claimed in claim 1, wherein the inter-working means is adapted to maintain user device presence indications upon receipt of device notifications in mobility event packages.

12. A non-transitory computer readable medium comprising software code for performing process steps of a roaming gateway comprising at least one IP network interface, and at least one cellular network interface, and an inter-working means for inter-working between a wireless IP network and a cellular network, wherein said process steps comprise:

communicating with user devices in an IP network according to a machine-level subscribe-and-notify event package protocol for managing handover of mobile devices roaming between IP and cellular networks, in which the gateway conducts a SIP subscribe and notify method with a device, and said method causes the device to notify the gateway, receive an acknowledgement from the gateway, and to then subscribe by sending a mobility event package with payload content including details of calls in progress, current bearers, and both WiFi and cellular signal strengths, using a subscribe method to trigger a device handover to a specified bearer;

polling a cellular network for subscriber status on that cellular network in the absence of a mobility event package;

accessing data on a HLR of a cellular network and performing HSS operations using said data;

applying routing policies specific to call types, allowing or disallowing the anchoring of calls originating in either an IP network or a cellular network based on number prefixes;

operating as an application server adapted to communicate with a user device as a client;

communicating with an SMSC in a cellular network to indicate a preference to receive messages for particular subscribers for whom it may subsequently attempt delivery of messages;

translating user-originating requests for configuration of stored supplementary service data into a format recognizable by a cellular network acting as a primary data store for that subscriber, or by intelligent network equipment; and receiving in a mobility event package from a user device capability data for the device, and using said data for delivery of messages to said device.

* * * * *